United States Patent
Nakagawa et al.

(10) Patent No.: US 8,408,891 B2
(45) Date of Patent: Apr. 2, 2013

(54) GOLF BALL MOLD AND GOLF BALL MANUFACTURING METHOD

(75) Inventors: Takuma Nakagawa, Saitamaken (JP); Katsunori Sato, Saitamaken (JP); Yoichi Omura, Saitamaken (JP)

(73) Assignee: Bridgestone Sports Co., Ltd, Tokyo (JP)

( * ) Notice: Subject to any disclaimer, the term of this patent is extended or adjusted under 35 U.S.C. 154(b) by 45 days.

(21) Appl. No.: 12/977,409

(22) Filed: Dec. 23, 2010

(65) Prior Publication Data

US 2012/0161363 A1   Jun. 28, 2012

(51) Int. Cl.
B29C 45/36  (2006.01)

(52) U.S. Cl. .............. 425/129.1; 425/116; 264/279.1; 473/377; 473/378; 473/383

(58) Field of Classification Search .......... 425/116, 425/129.1; 264/279.1; 473/377, 378, 383
See application file for complete search history.

(56) References Cited

U.S. PATENT DOCUMENTS

| | | | | |
|---|---|---|---|---|
| 5,975,869 A * | 11/1999 | Shimosaka et al. | ........... | 425/116 |
| 6,033,611 A * | 3/2000 | Yamaguchi | ................ | 264/250 |
| 6,050,803 A * | 4/2000 | Omura et al. | ............. | 425/116 |
| 6,129,881 A | 10/2000 | Puniello | | |
| 6,319,451 B1 * | 11/2001 | Brune | ................ | 264/278 |
| 6,605,243 B1 * | 8/2003 | Masutani | ................ | 264/278 |
| 6,787,091 B2 * | 9/2004 | Dalton et al. | ............. | 264/260 |
| 6,817,852 B2 * | 11/2004 | Lavallee | ................ | 425/116 |
| 6,866,802 B2 * | 3/2005 | Puniello et al. | ............. | 264/39 |
| 6,877,974 B2 * | 4/2005 | Puniello et al. | ............. | 425/116 |
| 7,223,085 B2 * | 5/2007 | Puniello et al. | ............. | 425/116 |
| 7,341,687 B2 * | 3/2008 | Puniello et al. | ............. | 264/278 |
| 7,704,431 B2 * | 4/2010 | Endo et al. | ................ | 264/275 |
| 7,718,107 B2 * | 5/2010 | Endo et al. | ................ | 264/278 |
| 7,727,437 B2 * | 6/2010 | Higuchi et al. | ............. | 264/162 |
| 8,083,977 B2 * | 12/2011 | Nakagawa et al. | ............. | 264/161 |
| 2001/0038167 A1 * | 11/2001 | Brune | ................ | 264/278 |
| 2002/0079615 A1 * | 6/2002 | Puniello et al. | ............. | 264/278 |
| 2002/0096801 A1 * | 7/2002 | Puniello et al. | ............. | 425/116 |
| 2002/0173385 A1 * | 11/2002 | Shannon et al. | ............. | 473/378 |
| 2004/0080080 A1 * | 4/2004 | Dalton et al. | ............. | 264/278 |
| 2004/0222555 A1 * | 11/2004 | Puniello et al. | ............. | 264/255 |

(Continued)

FOREIGN PATENT DOCUMENTS

| | | |
|---|---|---|
| JP | 8-323772 A | 12/1996 |
| JP | 2002-542067 A | 12/2002 |

*Primary Examiner* — Christina Johnson
*Assistant Examiner* — Saeed Huda
(74) *Attorney, Agent, or Firm* — Sughrue Mion, PLLC

(57) ABSTRACT

The invention provides a golf ball mold that includes a mold body configured as a plurality of mold parts which have at least a parting surface that defines a parting line at a golf ball equator and removably mate to form a cavity having an inner wall with a plurality of dimple-forming protrusions thereon, and a support pin which has an end face with a plurality of dimple-forming protrusions thereon and is extendable into and retractable from the cavity. The support pin extends into the cavity to support a center sphere and, when in a retracted state, the end face thereof defines a portion of the inner wall of the cavity. The end face of the support pin includes a pole of the cavity and has a peripheral edge which intersects a parallel of latitude at 10 degrees from the pole.

Using the golf ball mold of the invention, good molded pieces which do not give rise to problems such as appearance defects and irregular flash can be easily and reliably obtained, helping to improve golf ball productivity.

4 Claims, 6 Drawing Sheets

U.S. PATENT DOCUMENTS

| | | | |
|---|---|---|---|
| 2004/0251576 A1* | 12/2004 | Endo et al. | 264/259 |
| 2005/0098921 A1* | 5/2005 | Endo et al. | 264/278 |
| 2005/0173832 A1* | 8/2005 | Puniello et al. | 264/259 |
| 2005/0244530 A1* | 11/2005 | Puniello et al. | 425/116 |
| 2006/0273485 A1* | 12/2006 | Higuchi et al. | 264/162 |
| 2009/0297653 A1 | 12/2009 | Lavallee et al. | |

* cited by examiner

GOLF BALL MOLD AND GOLF BALL MANUFACTURING METHOD

BACKGROUND OF THE INVENTION

The present invention relates to a golf ball mold and a golf ball manufacturing method which may be suitably used for molding golf balls composed of a core encased by a cover of one or more layer, particularly for forming an outermost cover layer having a plurality of dimples formed on the surface thereof.

In recent years, there has been a strong desire for golf balls which possess various performance attributes, including not only distance, but also controllability, durability and feel on impact. Satisfying all of these attributes with only one type of material is generally difficult. Hence, the customary practice is to provide the ball with a structure in which a solid core formed of rubber, resin or the like, or a wound core, is encased by a cover of one or more layer, each layer having a particular function. In other words, efforts have been made to achieve a performance which addresses the needs of the player, such as a desire for distance or controllability, by adjusting the number and thickness of the above layers, and also adjusting the formulations, etc. of the materials making up the respective layers.

An injection-molding method is typically used to form the outermost layer of a golf ball having such a structure. Specifically, use is made of a method in which a core or a sphere (referred to below as a "center sphere") composed of such a core encased by one or more intermediate layer (a layer other than the outermost cover layer) is placed in the cavity of a given mold, and a cover-forming material is injected between the center sphere and the inner wall of the cavity. In this case, when the outermost layer is formed, numerous dimples are formed at the same time by numerous dimple-forming protrusions provided on the inner wall of the cavity.

Up until now, molds having the structure shown in FIG. 6 have often been used when producing golf balls by the above process. FIG. 6, a cross-sectional view showing an example of a golf ball mold according to the prior art, depicts the state prior to injection of the cover-forming material into the cavity.

In FIG. 6, a conventional mold 10 includes a mold body 20 having an upper mold half 20a and a lower mold half 20b which split at a parting surface that defines a parting line PL at a golf ball equator and removably mate to form a cavity 3 having an inner wall with numerous dimple-forming protrusions thereon, and includes support pins 40, each having on an end face thereof a single dimple-forming projection, which are extendable into and retractable from the cavity 3. The support pins 40 extend into the cavity 3 to support a center sphere 31 and, in the retracted state, the end faces thereof define a portion of the inner wall of the cavity 3. Moreover, although not fully shown here, the support pins 40 each have a circular cross-section, and a total of six pins—three in the upper mold half 20a and three in the lower mold half 20b— are provided so as to be spaced at given intervals at positions having 120 degree rotational symmetry about the pole Q as the center.

In the above mold 10, runners 50 and resin injection ports 60 having openings of given surface areas are formed along the parting surface of the mold body 20 in such a way as to inject, between the inner wall of the cavity 3 and the center sphere 31, a known cover-forming material from a known injection molding machine (not shown). Next, together with injection of the cover-forming material, the support pins 40 that were extended into the cavity are retracted, after which cooling is carried out, thereby completing formation of the cover. The dimples at the positions of the support pins 40 are formed at this time by the dimple-forming protrusions that were formed on the end faces of the support pins.

However, when the center sphere 31 is placed in the above mold 10 and the upper and lower mold halves are closed, the support pins 40 may be subjected to excessive forces, causing them to deflect or shift, as a result of which irregular flash sometimes forms on the surface of the molded ball. When irregular flash arises on the ball's surface, uniform trimming of the entire ball is difficult to carry out, which may lead to dimple irregularity and ultimately have an adverse effect on flight symmetry.

Moreover, because the end faces of the support pins 40 are generally obtained by machining the end face of a cross-sectionally circular member at an angle so as to impart a shape which defines a portion of the inner wall of the cavity 3 when the support pin is in a retracted state, the dimple-forming protrusion formed there often has an elliptical shape as seen from above. Such elliptically shaped dimples may sometimes adversely affect the ball's appearance, and are a major factor in lowering the degree of freedom in dimple design and mold design.

To address this problem, JP-A 08-323772 and U.S. Published Patent Application No. 2009/0297653 disclose golf ball molds wherein a center sphere placed in the mold is not supported using a plurality of thin support pins like those shown in FIG. 6; instead, a large-diameter support pin having on an end face thereof a plurality of dimple-forming protrusions is provided. However, in these molds, although the stability when supporting a center sphere improves, because the diameter of the support pin is too large, gases tend to collect near a pole of the cavity (at the center of the end face on the support pin) during injection molding, which may give rise to appearance defects.

In order to resolve the above problem of appearance defects, JP-A 2002-542067 (and the corresponding U.S. Pat. No. 6,129,881) and U.S. Pat. No. 7,341,687 disclose molds in which the venting of gases near the poles of the cavity has been improved by providing a gas-venting pin in the large-diameter support pin. However, the venting pin and the support pin must be separately fabricated, resulting in excessive costs.

In this way, various modifications have been made to golf ball molds so as to improve the golf ball moldability, but a fundamental solution has yet to be found for the above problems. Accordingly, for the sake as well of further improving the golf ball moldability and the degree of freedom in dimple design and mold design, there exists a desire for a novel approach which is capable of resolving the above-described problems.

SUMMARY OF THE INVENTION

It is therefore an object of the present invention to provide a golf ball mold which, particularly during formation of the outermost cover layer of a golf ball, is able to stably hold a center sphere inside the cavity and also vents gases well when the cover-forming material is injected into the cavity, minimizing appearance defects and the formation of problematic flash, and thus enabling stable molding to be carried out without giving rise to the above-described production problems. A further object of the invention is to provide a method of manufacturing golf balls using such a mold.

To achieve the above object, the invention provides the following golf ball mold and golf ball manufacturing method.

[1] A golf ball mold comprising a mold body configured as a plurality of mold parts which have at least a parting surface that defines a parting line at a golf ball equator and removably mate to form a cavity having an inner wall with a plurality of dimple-forming protrusions thereon, and a support pin which has an end face with a plurality of dimple-forming protrusions thereon and is extendable into and retractable from the cavity, the support pin extending into the cavity to support a center sphere and, when in a retracted state, the end face thereof defining a portion of the inner wall of the cavity, wherein the end face of the support pin includes a pole of the cavity and has a peripheral edge which intersects a parallel of latitude at 10 degrees from the pole.

[2] The golf ball mold of [1], wherein the end face of the support pin has three or more dimple-forming protrusions thereon.

[3] The golf ball mold of [2], wherein the end face of the support pin has four or more dimple-forming protrusions thereon.

[4] The golf ball mold of [1], wherein the peripheral edge of the end face on the support pin intersects a parallel of latitude at 8 degrees from the pole.

[5] A method of manufacturing a golf ball using the golf ball mold of [1], comprising the step of molding a cover by placing a center sphere in a mold cavity formed by removably mating a plurality of mold parts which have at least a parting surface that defines a parting line at a golf ball equator and supporting the center sphere with a support pin provided in the mold, then injecting a cover-forming material between the center sphere and the cavity inner wall while at the same time retracting the support pin.

The golf ball mold of the invention, by being provided with a support pin having a shape that satisfies certain conditions, is able to stably hold a center sphere within the cavity. As a result, eccentricity does not arise, enabling a golf ball of uniform structure to be obtained, and because gases near the poles of the cavity vent well when the cover-forming material is injected into the cavity, appearance defects do not arise. In addition, irregular flash caused by the deflection or shifting of support pins that has been a concern in conventional molds does not arise, as a result of which good molded pieces can be easily and reliably obtained, thus contributing to enhanced golf ball productivity. Also, because the shape of the support pin used in the inventive mold is not subject to dimple design constraints, the degree of freedom in dimple design and mold design can be greatly enhanced. Furthermore, the inventive mold also has cost advantages in that there is no need to separately manufacture the gas venting pins provided in the large-diameter support pins that are described in the prior art.

BRIEF DESCRIPTION OF THE DIAGRAMS

DETAILED DESCRIPTION OF THE INVENTION

The golf ball mold of the invention is described more fully below in conjunction with the appended diagrams. The "parting line" and "parting surface" of the mold, as used in the description below, are defined as follows. The "parting line" is a line that serves as a reference when the mold splits into a plurality of parts. For example, in the case of a mold that splits into two parts, the parting line refers to a line that serves as a reference for the mating of the upper mold half with the lower mold half, and is rectilinear. The "parting surface" of the mold refers to the area of contact when the respective mold parts that have been separated based on the above parting line are joined together. In a case where dimple-forming protrusions which lie across the parting line are provided on the parting surface, the parting surface has convex features due to the dimple-forming protrusions and also has concave features which correspond to the convex features. In the present invention, the shape of the parting surface may be suitably set according to the mold specifications, and is not subject to any particular limitation.

It is sufficient for the golf ball mold of the invention to have at least a parting surface that defines a parting line at a golf ball equator; the number of parts into which the mold splits may be suitably set according to the mold specifications, and is not subject to any particular limitation. For example, when the number of parting surfaces in the mold is small, such as in a two-part mold having a single parting surface, mold production costs and limitations on the dimple configuration can be reduced. On the other hand, in cases where a plurality of parting surfaces are provided and the mold splits into a larger number of parts, the mold release properties of the molded article can be improved. For the sake of simplicity, the mold used in the description that follows is a two-part mold which splits along the golf ball equator as the parting line.

Figure 1:
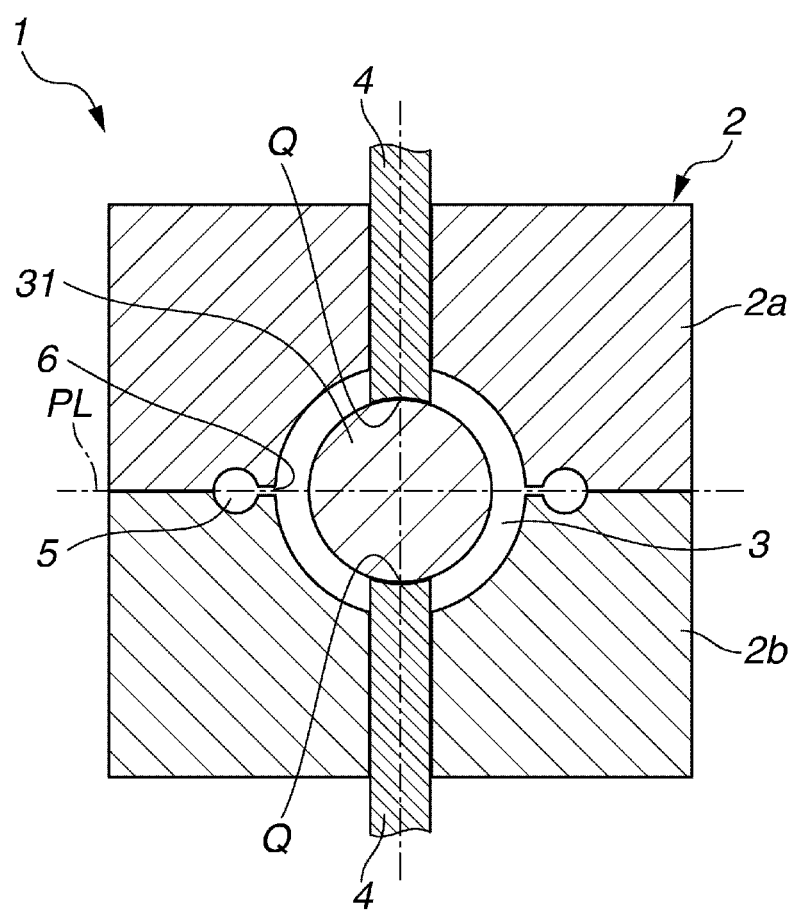
FIG. 1 is a cross-sectional view of a golf ball mold according to an embodiment of the invention.

FIG. 1 shows an embodiment of the golf ball mold according to the present invention.

FIG. 1 is a cross-sectional view of a golf ball mold according to one embodiment of the invention. The mold 1 shown here includes a mold body 2 configured as an upper mold half 2a and a lower mold half 2b which have a parting surface that defines a parting line PL at a golf ball equator and removably mate to form a cavity 3 having an inner wall with a plurality of dimple-forming protrusions thereon, and support pins 4 which have an end face with a plurality of dimple-forming protrusions thereon and are extendable into and retractable from the cavity 3. In addition, runners 5 and resin-injection ports 6 having openings of give surface areas are formed along the parting surface of the mold body 2 in such a way as to inject, between the inner wall of the cavity 3 and the center sphere 31, a known cover-forming material from a known injection molding machine (not shown). When the cover-forming material is injected, gases within the cavity 3 are released to the exterior through gaps between the mold body 2 and the support pins 4.

In FIG. 1, the support pins 4 extend into the cavity 3 to support the center sphere 31 and, when in a retracted state after injection of the cover-forming material, the end faces thereof define a portion of the inner wall of the cavity 3. Moreover, these support pins 4 differ in shape from the conventionally used large-diameter support pins in that a plurality of dimple-forming protrusions are provided on the end faces thereof, and also satisfy the subsequently described conditions. Support pin 4 shapes which may be employed in the golf ball mold 1 of the invention are described in detail below while providing specific examples.

Figure 2:
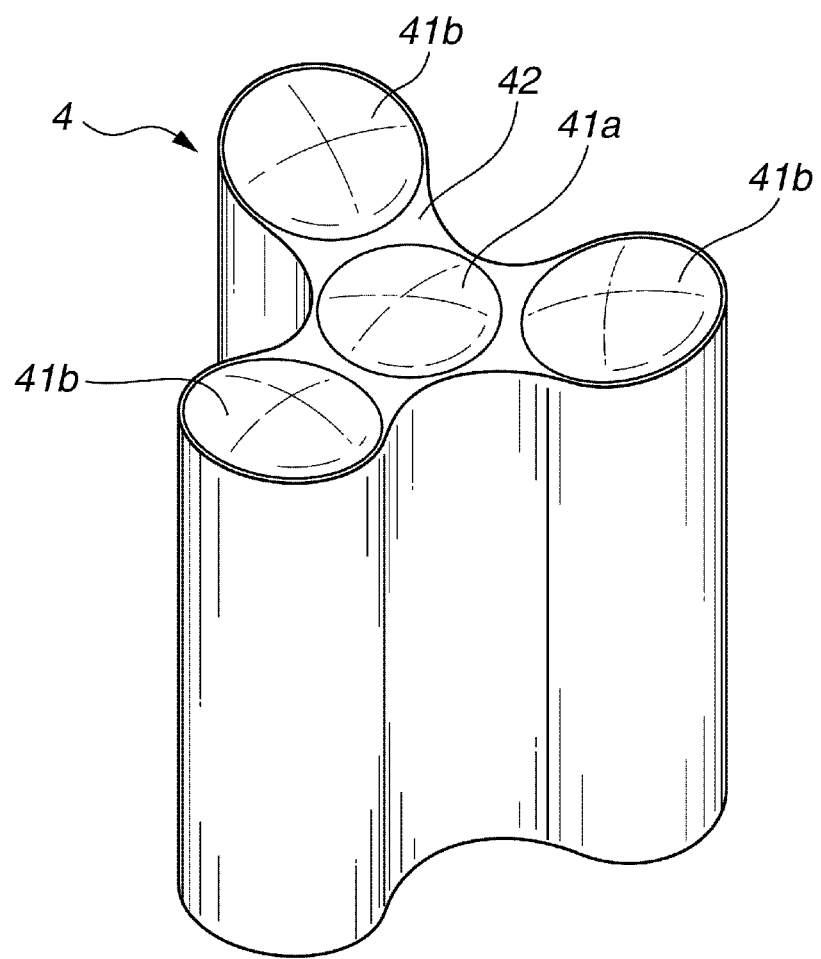
FIG. 2 is an enlarged perspective view of the vicinity of an end portion of a support pin in the golf ball mold shown in FIG. 1.
Figure 3:
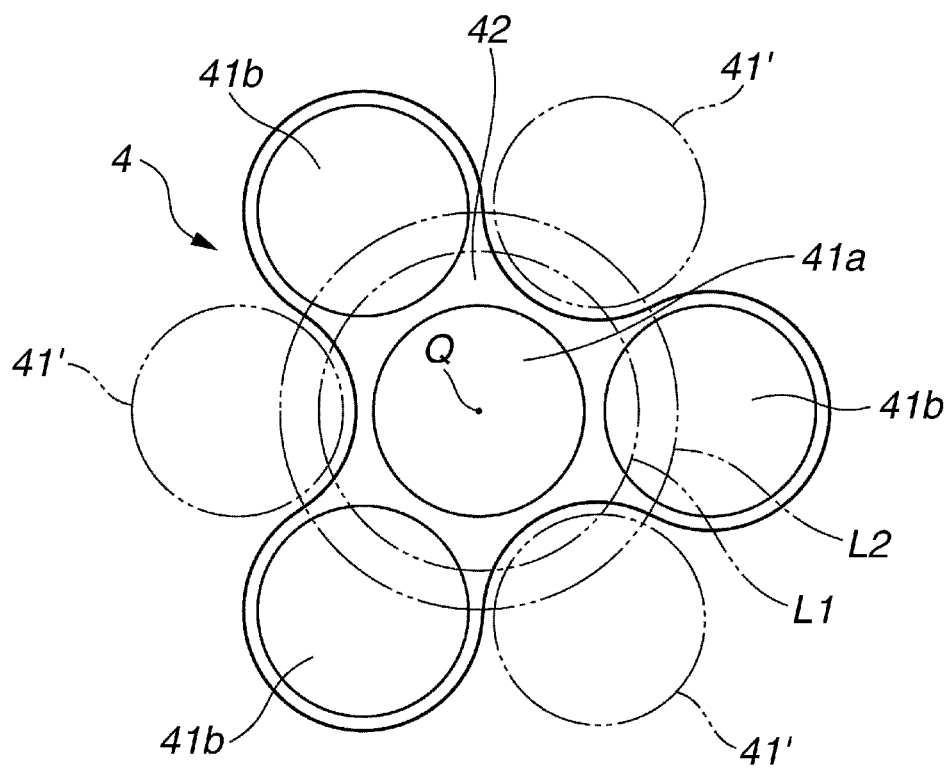
FIG. 3 is a top view of the support pin in FIG. 2, as seen from an end face side thereof.

FIGS. 2 and 3 show an example of a support pin 4 shape which satisfies the conditions of the invention. FIG. 2 is an enlarged perspective view of the vicinity of an end portion of a support pin 4, and FIG. 3 is a top view of the support pin 4 shown in FIG. 2, as seen from an end face side thereof. In FIG. 3, Q represents a pole of the cavity 3, and the circles L1 and L2 drawn with dashed lines indicate the parallels of latitude at, respectively, 10 degrees and 8 degrees from the pole Q.

The support pin 4 has, transferred to the end face thereof, four dimples which have been set on the golf ball surface so as to correspond to the position where the support pin is disposed. The end face has a shape in which three dimple-forming protrusions 41b are arranged in the form of an equilateral triangle having arcuate vertices that follow the margins of the dimple-forming protrusions 41b, with one more dimple-forming protrusion 41a being situated at a center portion of this equilateral triangle, and which curves arcuately inward along the margins of dimple-forming protrusions 41' on the mold body 2 adjoining the three sides of the equilateral triangle. A land region 42 (a region corresponding to, on the surface of the molded ball, lands where dimples are not formed) of a given width is provided between a peripheral edge of the end face and each of the above dimple-forming protrusions 41a and 41b, so as to give a state in which the four dimple-forming protrusions 41a and 41b are completely included on the end face. Here, the shape of the support pin 4 may be suitably set according to the dimple design, and is not subject to any particular limitation. However, from the standpoint of stably supporting the center sphere during molding, it is preferable for the shape to have symmetry, with a shape in which the dimple-forming protrusions are arranged so as to have linear symmetry or rotational symmetry overall being especially preferred. Moreover, in FIGS. 2 and 3, the dimple-forming protrusions 41a and 41b are all circular as seen from above, and have diameters of about 4 mm (the size at which 4 mm diameter dimples form on the surface of the golf ball).

From the standpoint of stably supporting the center sphere 31, it is critical for the support pin 4 to include a pole Q of the cavity. Preferably, it is recommended that the pole Q be made to coincide with the center of the end face on the support pin 4. If the end face of the support pin 4 does not satisfy the above conditions, it may be difficult to stably support the center sphere 31. In the example shown in FIGS. 2 and 3, the center of the end face on the support pin 4 and the center of the dimple-forming protrusion 41a coincide with the pole Q.

Next, it is critical for the peripheral edge of the end face on the support pin 4 to intersect a parallel of latitude L1 at 10 degrees from the pole Q, and it is recommended that it preferably intersect a parallel of latitude L2 at 8 degrees from the pole Q. The latitude lower limit, although not subject to any particular limitation, may be set to a parallel of latitude at 0.5 degree from the pole Q (not shown). In cases where the above condition is not satisfied, gases near the pole Q have difficulty venting during molding, which may result in appearance defects. In the example shown in FIGS. 2 and 3, the peripheral edge of the end face on the support pin 4 curves deeply inward toward the pole Q, intersecting with the parallels of latitude at 10 degrees and 8 degrees. As a result, gases vent well near the pole Q.

At the same time, although not subject to any particular limitation, it is recommended that the peripheral edge of the end face on the support pin 4 preferably not exceed the parallel of latitude at 40 degrees from the pole Q, more preferably not exceed the parallel of latitude at 35 degrees, and even more preferably not exceed the parallel of latitude at 30 degrees (these parallels of latitude are not shown in the diagrams). In cases where the peripheral edge of the end face on the support pin 4 exceeds the above parallel of latitude, because the diameter of the support pin 4 becomes too large, the material may not spread entirely throughout the space that arises from retraction of the support pin 4 during molding, as a result of which poor filling may occur. Here, although not illustrated in the diagrams, the outermost portion of the peripheral edge of the support pin 4 shown in FIGS. 2 and 3 coincides with the parallel of latitude at 17.8 degrees from the pole Q (not shown).

The width of the above land region 42 is not subject to any particular limitation, and may be suitably set in accordance with, for example, the dimple design and the mold design. That is, where necessary, places may be provided where the peripheral edge of the end face coincides with the margins of the dimple-forming protrusions.

The number of dimple-forming protrusions formed on the end face of the support pin 4 may be suitably set according to, for example, the dimple design and the mold specifications, and is not subject to any particular limitation. However, from the standpoint of the stability when holding the center sphere, it is recommended that the number of dimple-forming protrusions provided on the end face be preferably three or more, and especially four or more. The upper limit in the number of dimple-forming protrusions provided on the end face, although not subject to any particular limitation, is preferably not more than twenty, more preferably not more than ten, and even more preferably not more than seven. When the number of dimple-forming protrusions provided on the end face of the support pin 4 is too high, because the diameter of the support pin 4 becomes too large, the material may not spread entirely throughout the space that arises from retraction of the support pin 4 during molding, as a result of which poor filling may occur.

The gap between the support pin 4 and the upper mold half 2a or the lower mold half 2b, although not subject to any particular limitation, is typically set in a range where the support pin 4 slides smoothly during molding, flash formation can be held to a minimum, and gases within the cavity 3 can be rapidly released to the exterior. A gap within a range of from 5 to 50 μm is preferred. If the gap is too large, the flash becomes large. On the other hand, if the gap is too small, gases within the cavity 3 are not easily vented, which may lead to appearance defects. In FIGS. 2 and 3, the above gap is set to 25 μm.

Figure 4:
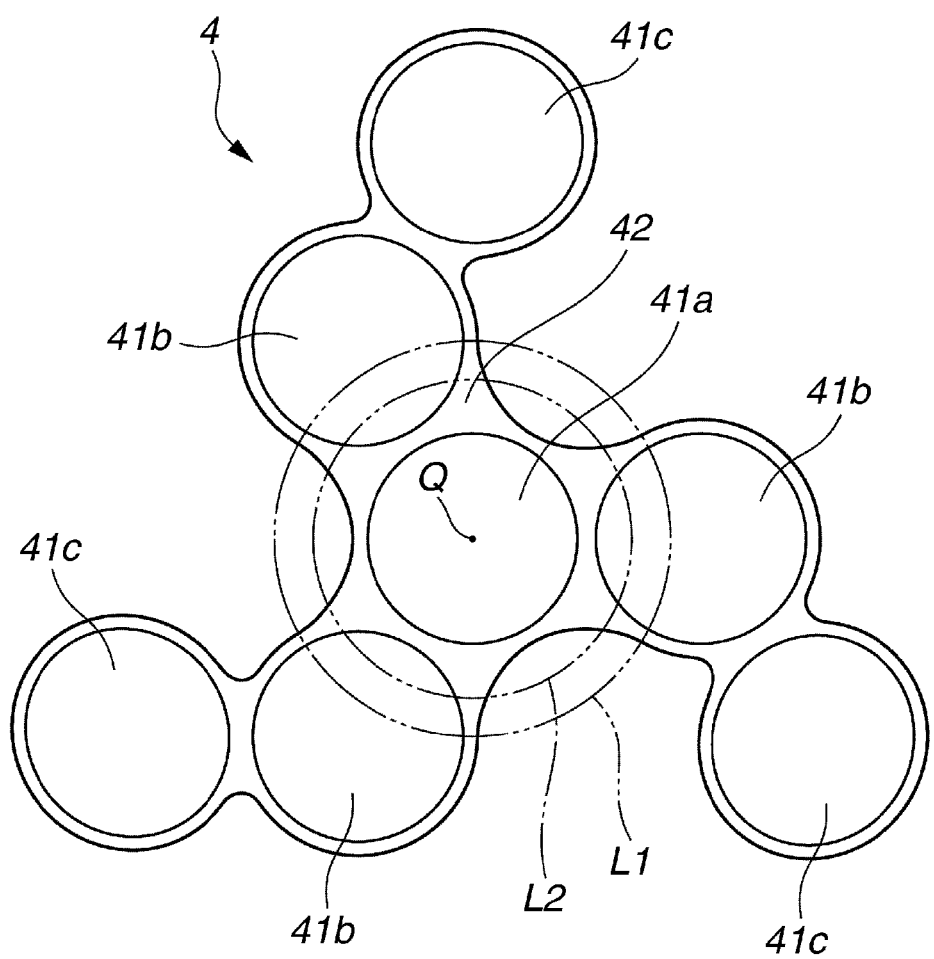
FIG. 4 is a top view of the support pin in a golf ball mold according to another embodiment of the invention, as seen from the end face side thereof.

Another example of a support pin shape which satisfies the conditions of the invention is shown in FIG. 4.

FIG. 4 is a top view of the support pin as seen from the end face side thereof. In FIG. 4, as mentioned above, the symbol Q represents the pole of the cavity 3, and circles L1 and L2 drawn with dashed lines represent the parallels of latitude at, respectively, 10 degrees and 8 degrees from the pole Q.

This support pin 4 has a shape wherein circular areas which include dimple-forming protrusions 41c have been added outside of the dimple-forming protrusions 41b on the support pin 4 shown in FIGS. 2 and 3, thereby providing a shape having a total of seven dimple-forming protrusions on the end face. This support pin too has, transferred to the end face thereof, seven dimples which have been set on the golf ball surface so as to correspond to the position where the support pin is disposed. Moreover, as described above, because a land region 42 of given width is provided between the peripheral edge of the end face and the respective dimple-forming protrusions 41a, 41b and 41c, the result is a state wherein the seven dimple-forming protrusions 41a, 41b and 41c are entirely included within the end face. In this case, because the center of the end face on the support pin 4 and the center of the dimple-forming protrusion 41a coincide with the pole Q, and the respective dimple-forming protrusions are arranged with rotational symmetry overall, the center sphere 3 can be more stably held during molding. In addition, this peripheral edge curves deeply inward, intersecting the parallels of latitude at 10 degrees and 8 degrees from the pole Q, and thereby forming a shape which readily vents gases near the pole Q during molding. In FIG. 4, the dimple-forming protrusions 41a, 41b and 41c are all circular as seen from above, and have diameters of about 4 mm (the size at which 4 mm diameter dimples form on the surface of the golf ball). The outermost portion of the peripheral edge of the support pin 4 coincides with the parallel of latitude at 26.5 degrees from the pole Q, and the gap between the support pin 4 and the upper mold half 2a or the lower mold half 2b is 25 µm.

Figure 5:
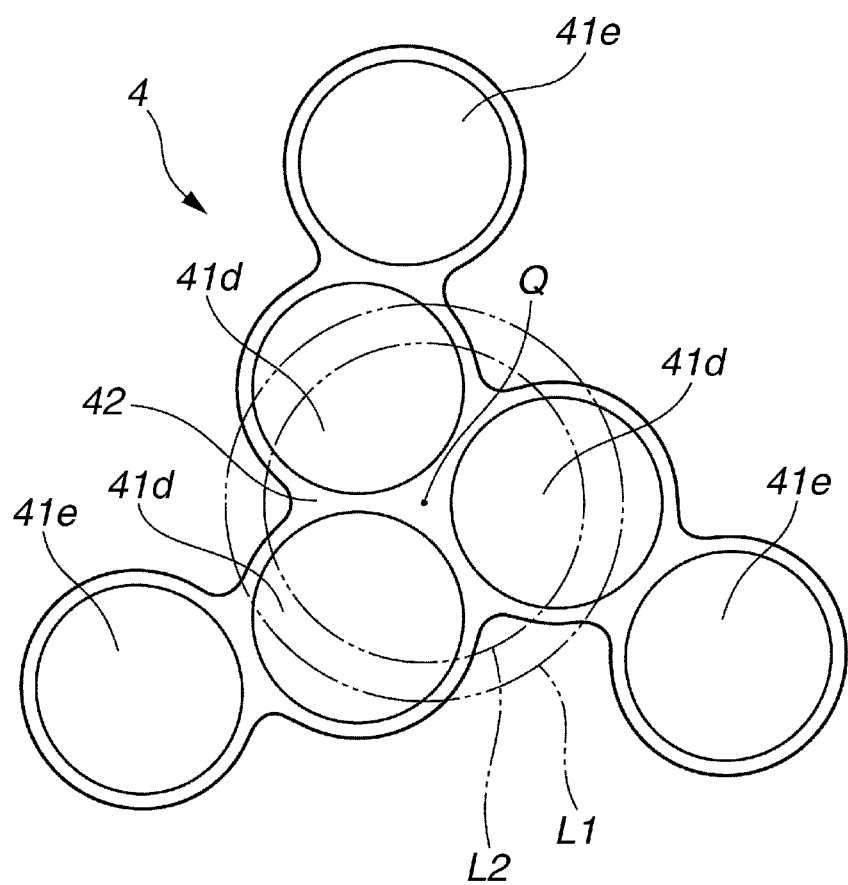
FIG. 5 is a top view of the support pin in a golf ball mold according to yet another embodiment of the invention, as seen from the end face side thereof.
Figure 6:
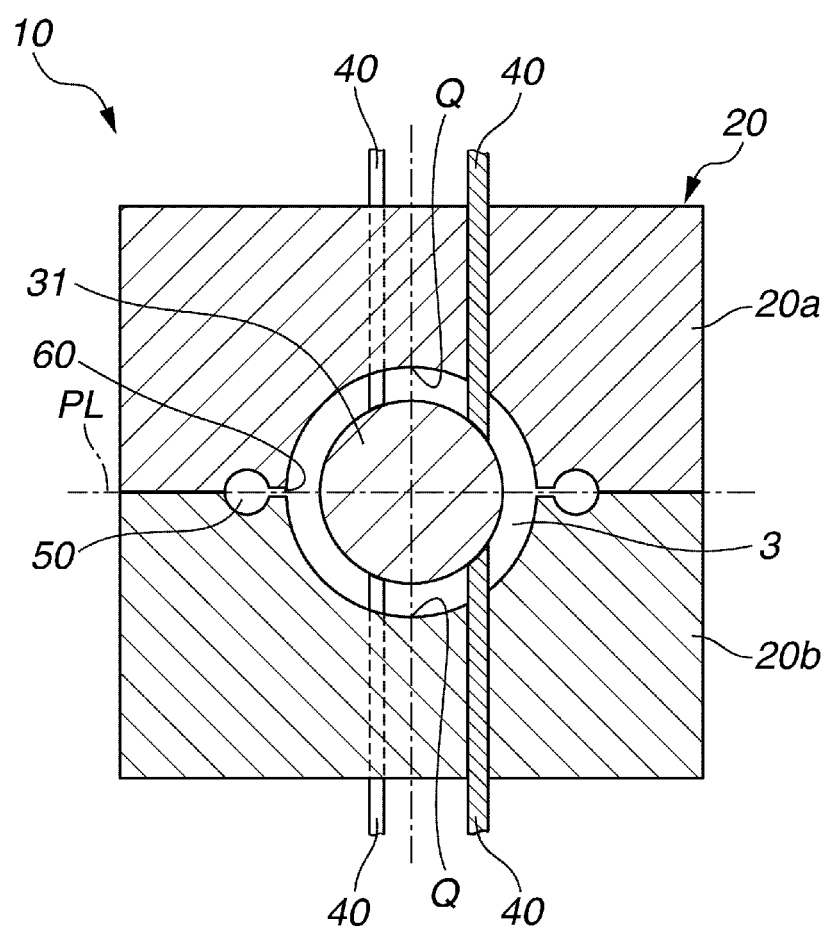
FIG. 6 is a cross-sectional view of an example of a golf ball mold according to the prior art.

FIG. 5 shows yet another example of a support pin shape which satisfies the conditions of the invention.

FIG. 5 is a top view of this support pin, as seen from the end face side thereof. In FIG. 5, as mentioned above, the symbol Q represents the pole of the cavity 3, and circles L1 and L2 drawn with dashed lines represent the parallels of latitude at, respectively, 10 degrees and 8 degrees from the pole Q.

This support pin 4 has three dimple-forming protrusions 41d arranged thereon in the form of an equilateral triangle, one dimple-forming protrusion 41e added outside each of the three dimple-forming protrusions 41d, and a land region 42 of a given width provided between the six dimple-forming protrusions 41e and 41d and the peripheral edge of the end face. This support pin too has, transferred to the end face thereof, six dimples which have been set on the golf ball surface so as to correspond to the position where the support pin is disposed. Moreover, because a land region 42 of a given width is provided between the peripheral edge of the end face and the respective dimple-forming protrusions 41d and 41e, the result is a state wherein the six dimple-forming protrusions 41d and 41e are entirely included within the end face.

The peripheral edge of the support pin 4 has a shape with curved areas that follow the margins of each of the dimple-forming protrusions 41d and 41e, these curved areas, which are mutually adjoining, being connected by smooth curves. In particular, between the mutually adjoining dimple-forming protrusions 41d, the peripheral edges curve deeply toward the pole Q and intersect the parallels of latitude at 10 degrees and 8 degrees from the pole Q. As a result, this support pin 4 also has a shape that readily vents gases near the pole Q during molding. In this case, because the dimple-forming protrusions 41d and 41e are arranged with rotational symmetry overall and because the center of the end face on the support pin 4 coincides with the center of symmetry for the dimple-forming protrusions 41d and 41e and with the pole Q, the center sphere 31 can be more stably held during molding. In FIG. 5, the dimple-forming protrusions 41d and 41e are all circular as seen from above, and have diameters of about 4 mm (the size at which 4 mm diameter dimples form on the surface of the golf ball). Moreover, the outermost portion of the peripheral edge of the support pin 4 coincides with the parallel of latitude at 23.4 degrees from the pole Q, and the gap between the support pin 4 and the upper mold half 2a or the lower mold half 2b is 25 µm.

Because the end face of the support pin 4 can define a portion of the inner wall of the cavity 3, dimple-forming protrusions which are circular as seen from above can easily be formed. Moreover, depending on the dimple design, it is also possible to directly form dimple-forming protrusions of non-circular shapes, such as polygonal, teardrop or oval shapes, while maintaining symmetry, etc. for the ball as a whole. Accordingly, there are no constraints on dimple design, resulting in a very high degree of freedom in dimple design and mold design.

The material used in the golf ball mold of the invention may be a known material, and is not subject to any particular limitation.

When a golf ball is molded using the golf ball mold of this invention, molding may be carried out by a method and under conditions similar to those employed when using a conventional mold. More specifically, when the two-part mold 1 shown in FIG. 1 is used, first, a center sphere 31 is placed inside the cavity of the mold 1, and the center sphere 31 is supported by support pins 4 that have been provided in the mold 1. Next, a known cover-forming material is injected, via runners 5 and resin injecting ports 6, between the center sphere 31 and the inner wall of the cavity 3, along with which the support pin 4 is retracted. Cooling and solidification are then carried out, following which the upper and lower mold halves are separated and the molded article is removed. The resulting molded article is gate cut and trimming is carried out by an ordinary method to remove flash, thereby giving a golf ball having a cover of one or more layer formed over a core. To enhance the design and durability of the golf ball, the surface of the golf ball thus obtained may be subjected to various treatments such as stamping and painting by known methods.

The cover-forming material used here may be a known thermoplastic resin and is not subject to any particular limitation, although preferred use may be made of an ionomer resin or a urethane resin. The thickness of the cover formed may be suitably selected according to, for example, the construction and materials of the golf ball to be manufactured, and is not subject to any particular limitation.

In the golf ball manufactured by the above method, the shape, number and arrangement of the dimples formed on the surface may be suitably set according to the ball specifications, and are not subject to any particular limitation. For example, the dimple shape is not limited to a circular shape, and may also be suitably selected from among non-circular shapes such as polygonal, teardrop and oval shapes. The dimple diameter, although not subject to any particular limitation, is preferably set in a range of from 0.5 to 6 mm. The dimple depth, although likewise not subject to any particular limitation, is preferably set in a range of from 0.05 to 0.4 mm.

The surface coverage by dimples on the surface of the ball is not subject to any particular limitation. However, from the standpoint of the aerodynamic properties, this value is set to preferably at least 70%, more preferably at least 75%, and even more preferably at least 80%. By using the mold of the invention, balls having a high surface coverage can easily be manufactured.

Although preferred embodiments of the invention have been described above in conjunction with the diagrams, the golf ball mold of the invention is not limited by the diagrams and the above embodiments and may be suitably modified within the spirit and scope of the present invention. That is, the shape of the parting surface of the mold and the number of parts into which the mold splits, and the number and positioning of the support pins specified in the invention may be varied within a range that does not depart from the spirit and scope of the invention. For example, in the mold shown in FIG. 1, the support pins 4 provided in the upper mold half 2a and the lower mold half 2b need not necessarily be of identical shape, and may be given differing shapes according to, for example, the dimple design. By way of illustration, one could, for instance, adopt a construction in which the upper mold half 2a is provided with the support pin shown in FIGS. 2 and 3 and the lower mold half 2*b* is provided with the support pin shown in FIG. 4. In addition, known pins and the like may be added, where necessary.

As explained above, the golf ball mold of the present invention, by being provided with a support pin having a shape which satisfies certain conditions, is able to stably hold the center sphere at the center of the cavity. Hence, eccentricity does not arise, enabling a golf ball having a uniform structure to be obtained. In addition, the venting of gases near the poles when the cover-forming material is injected into the cavity is good, as a result of which appearance defects do not arise. Moreover, because irregular flash caused by the deflection and shifting of support pins, which has been a concern in conventional molds, does not occur, good molded articles can be easily and reliably obtained, contributing to enhanced golf ball productivity. Also, the shape of the support pin used in the inventive mold is not subject to any dimple design constraints, enabling the degree of freedom in dimple design and mold design to be greatly enhanced. Finally, the inventive mold also provides cost advantages in that there is no need for the separate fabrication of the gas-venting pins used in the large-diameter support pins having a plurality of dimple-forming protrusions on the end face which have hitherto been described in the art.

The invention claimed is:

1. A golf ball mold comprising a mold body configured as a plurality of mold parts which have at least a parting surface that defines a parting line at a golf ball equator and removably mate to form a cavity having an inner wall with a plurality of dimple-forming protrusions thereon, and a support pin which has an end face with a plurality of dimple-forming protrusions thereon and is extendable into and retractable from the cavity, the support pin extending into the cavity to support a center sphere and, when in a retracted state, the end face thereof defining a portion of the inner wall of the cavity,
  wherein the end face of the support pin includes a pole of the cavity and has a peripheral edge which intersects a parallel of latitude at 10 degrees from the pole.

2. The golf ball mold of claim 1, wherein the end face of the support pin has three or more dimple-forming protrusions thereon.

3. The golf ball mold of claim 2, wherein the end face of the support pin has four or more dimple-forming protrusions thereon.

4. The golf ball mold of claim 1, wherein the peripheral edge of the end face on the support pin intersects a parallel of latitude at 8 degrees from the pole.

* * * * *